I. G. VAIL.
Corn-Dropper.
No. 161,363.　　　　　　　　　　　Patented March 30, 1875.
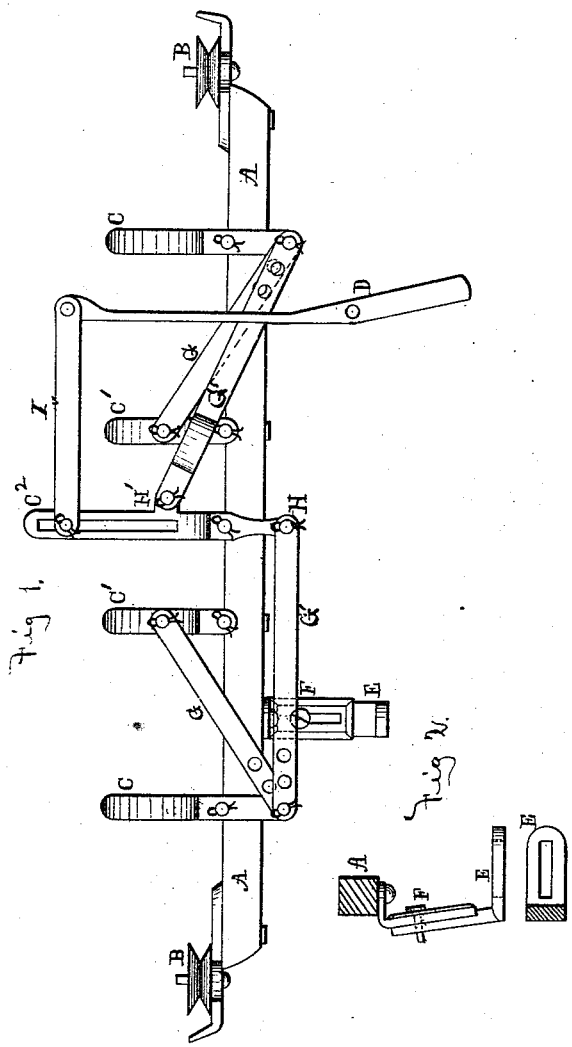
WITNESSES.　　　　　　　　　　　INVENTOR.

UNITED STATES PATENT OFFICE.

ISAAC G. VAIL, OF LOGAN COUNTY, ILLINOIS.

IMPROVEMENT IN CORN-DROPPERS.

Specification forming part of Letters Patent No. 161,363, dated March 30, 1875; application filed January 12, 1875.

*To all whom it may concern:*

Be it known that I, ISAAC G. VAIL, of the county of Logan, in the State of Illinois, have invented an Improvement, new and useful, on a Machine for Dropping Corn in Check-Rows; and I do hereby declare the following to be a full and exact description thereof, which will enable others skilled in the art to make and use the same, reference being had to the accompanying drawing forming part of this specification, in which—

Figure 1 is a side view of the check-row attachment, and Fig. 2 a sectional view of the adjustable brackets.

In the machine or class of machines to which this my improvement is applicable the machinery of the dropper is operated by a rope, on which, at equal and proper distances, are buttons or enlargements of suitable material.

The bar A A shown in the drawing, with grooved wheels B B and oscillating bars C C, is fastened by bolts or otherwise to the planter, on a line parallel to the axis of the planter-wheels. The rope is made fast at opposite ends of the corn-rows to be planted. As the planter with the dropper so attached is drawn across the field the rope is caused to pass around the wheels B B, and through the forks or clutches of the levers C C$^1$. The buttons or enlargements on the rope are successively brought in contact with the clutches or forks in the levers C C$^1$, thus operating them, and, through their connections, the machinery of the planter to which they are attached. Each of the outer forked levers C is connected with one of the inner forked levers C nearest to it by a bar or rod, G, the fastening being made by hubs on the levers, with linchpins and holes in the bars or rods. These connecting bars or rods attach to the outer forked levers below the fulcrum, and to the inner forked levers above the fulcrum, substantially as shown in the drawings made a part of this specification. The effect of this is to give to each of the inner forked levers C$^1$ a motion the reverse of that of the outer forked levers C, to which it is attached. The outer forked levers are connected, respectively, with the central slotted lever C$^2$ by bars or rods G$'$, of the same character as those connecting the outer to the inner forked levers. These connecting rods or bars are attached to the outer forked levers below the fulcrum, and one of them attaches or connects with the central slotted lever below its fulcrum at H, and the other attaches to it above the fulcrum at H$'$. This arrangement reverses the motion communicated through the central slotted lever from one outer forked lever to the other. The design of thus connecting the forked levers is to give to them the necessary backward or return motion, the buttons on the rope, by their direct action, moving the levers only in one direction. The spring-bar D is bolted to the working handle of the corn-planter, and is connected with the central slotted lever C$^2$ by a bar or rod. This rod or bar I is fastened in the slot of the central slotted lever by means of a set-screw, and may be raised or lowered at will, thereby lengthening or shortening the stroke.

Similar letters indicate and refer to like parts of the drawing.

The improvements embraced in this invention consist, first, in attaching or connecting the lever of the planter with the dropper by means of the spring-bar D, which spring is made sufficiently stiff to operate the lever of the planter and sufficiently flexible to yield to greater force. The effect of this improvement is, in case the buttons or enlargements on the rope should catch in the clutches of the levers C C$^1$, which they are liable to do, the yielding of the spring allows the levers C C$^1$ to vibrate further, and thereby releases the button from the clutches or the levers C C$^1$. Second, in attaching the dropper to planters of different kinds, it is necessary to its proper working that it should be attached to each machine at a height to suit the formation of such machines. To effect this in my improvement the piece E, made of cast or wrought iron, is attached to the frame of the planter, and is adjustable by means of a set-screw or bolt passing through a slot in its foot. The piece F, also made of cast or wrought iron, is fastened by means of bolts to the dropper-bar A A, and is adjustable by means of a bolt or set-screw passing through the slot and through the piece E. This dropper may thus be attached or fastened to any machine, whether made expressly for it or not.

The two clutches or forks C$^1$ C$^1$, attached to the bar A A between those, C C, attached nearest the ends of said bar, will enable the machinery to drop corn in drills, the distance apart of such dropping being regulated by the distance that one clutch is set from another on said bar.

I claim as new, and desire to secure by Letters Patent—

1. The combination, in a corn-planter, of the spring-bar D with the forked levers C C¹ and lever C² and supporting-bar A, substantially in the manner and for the purpose set forth.

2. The combination, with the planter-frame and the supporting-bar A, of the adjusting-pieces E and F, for adjusting the height of the check-row attachment, substantially in the manner and for the purposes described.

ISAAC G. VAIL.

Witnesses:
  WM. B. JONES,
  WM. O. JONES.